Patented May 4, 1937

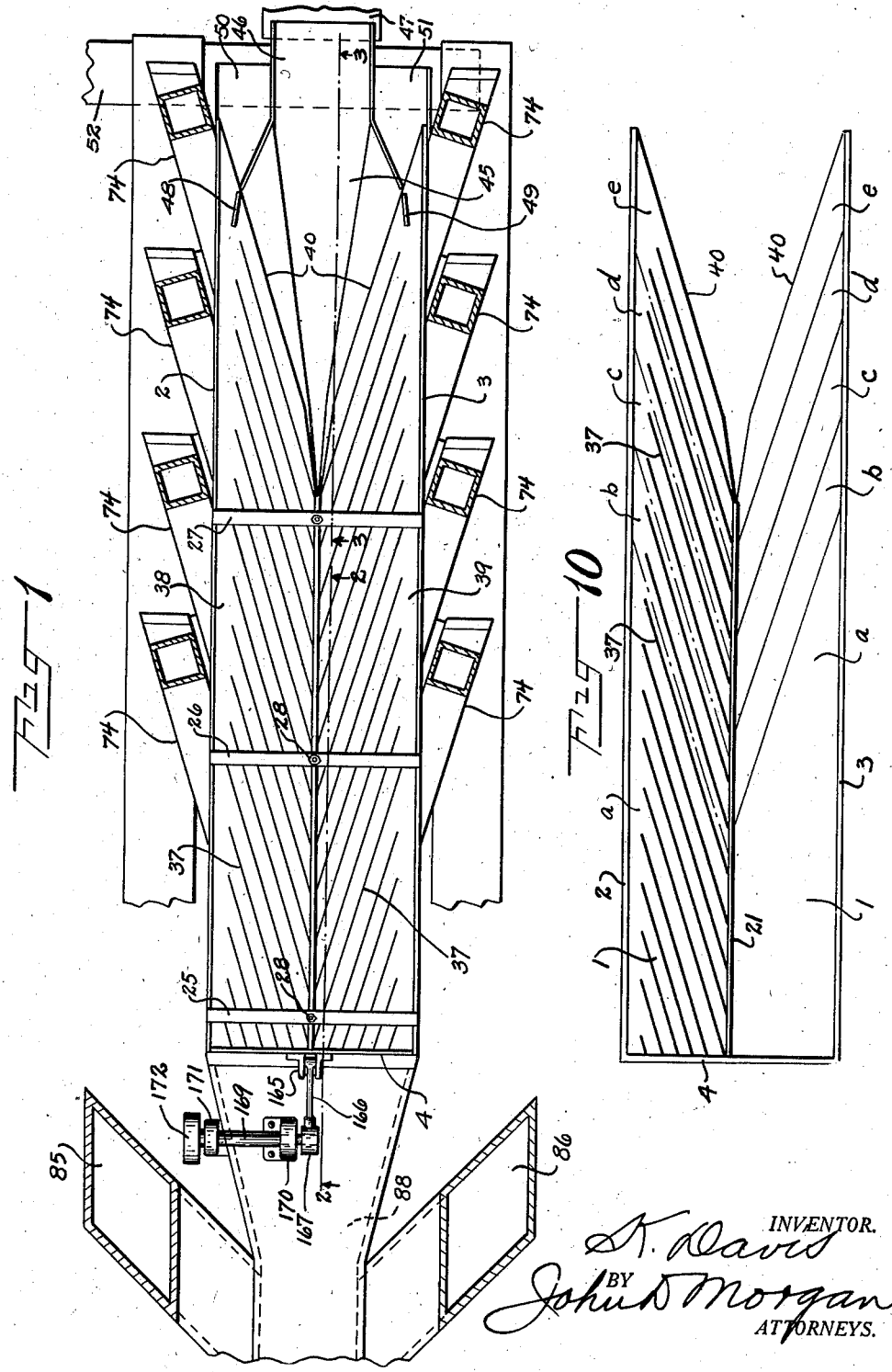

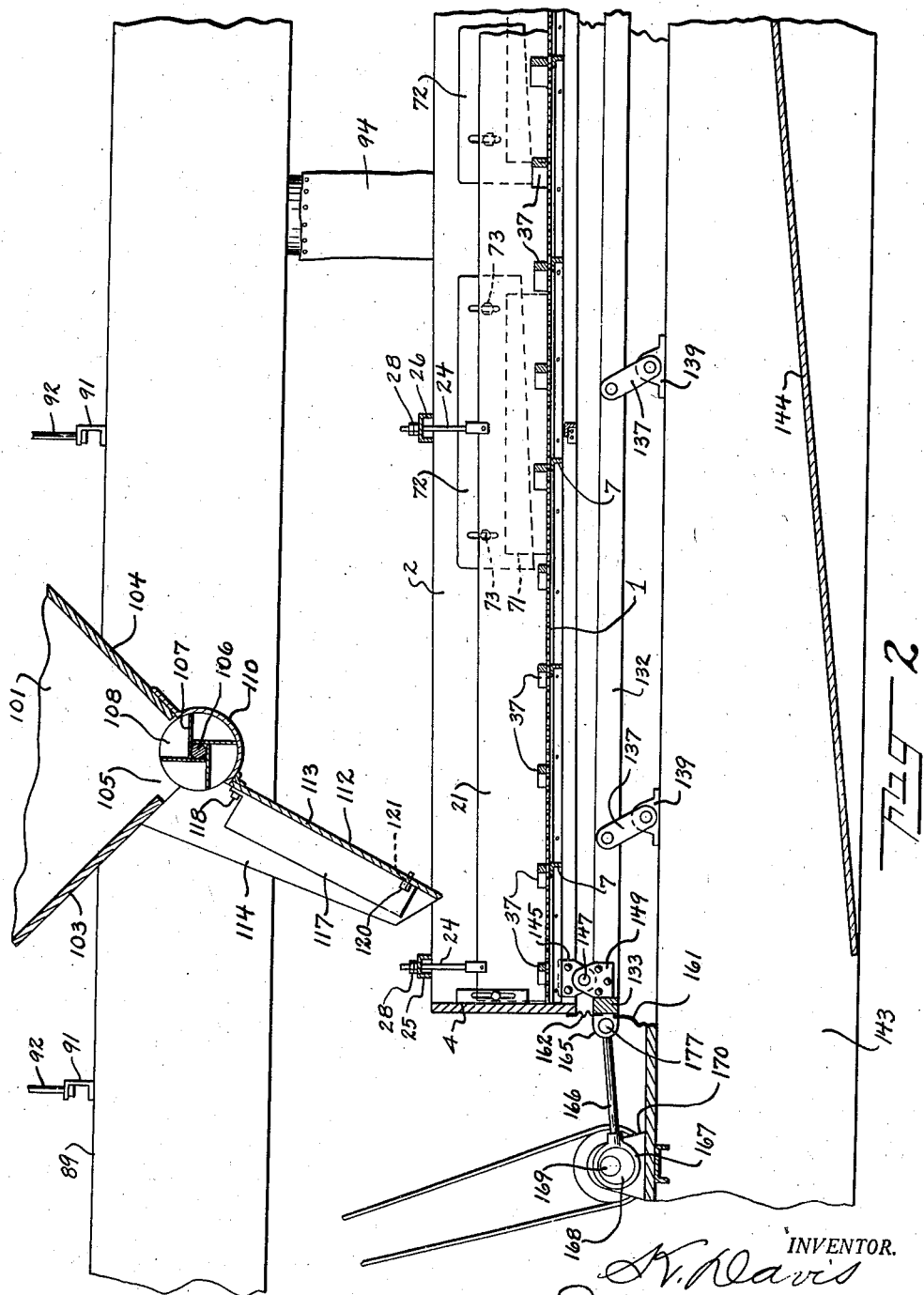

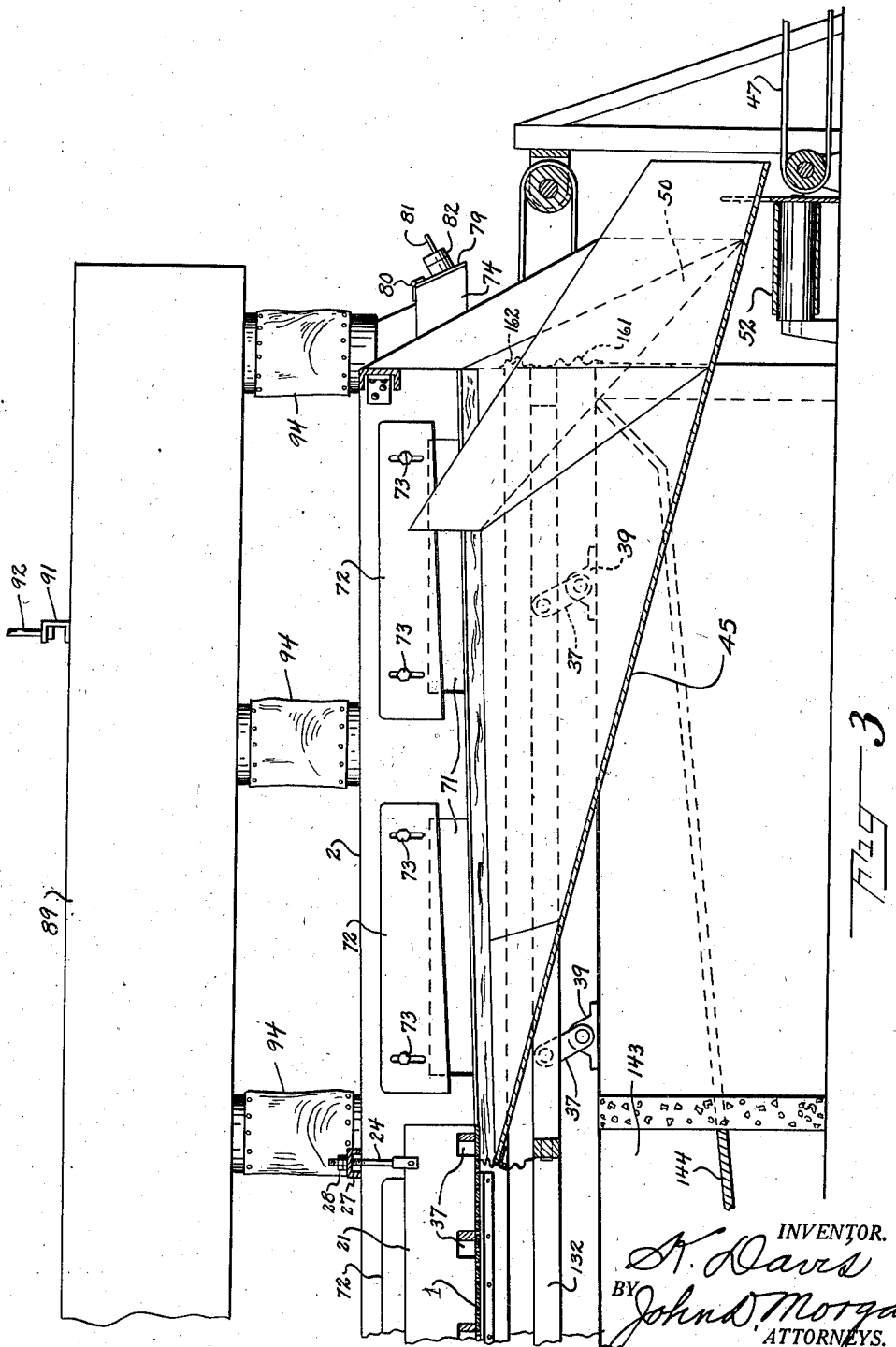

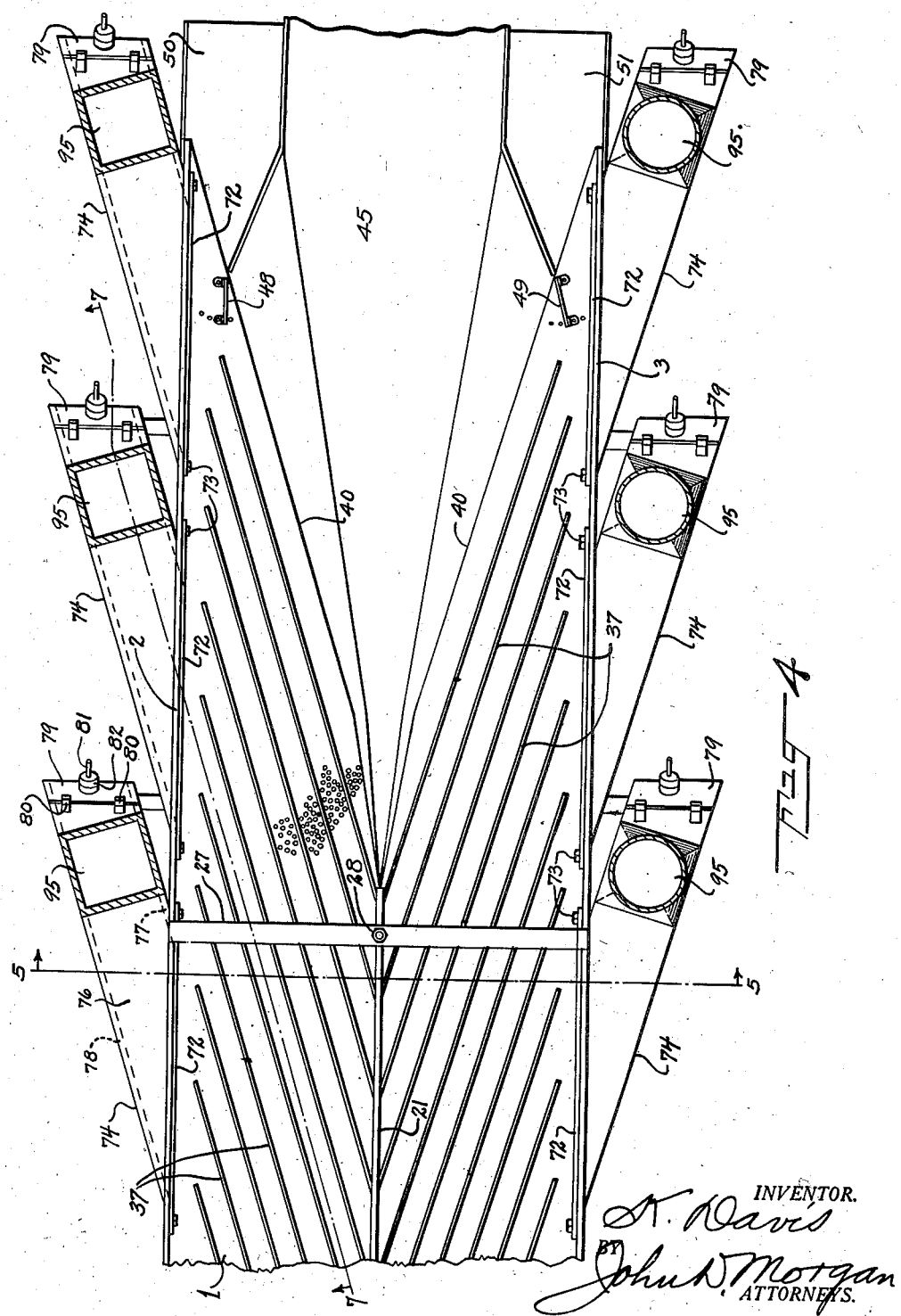

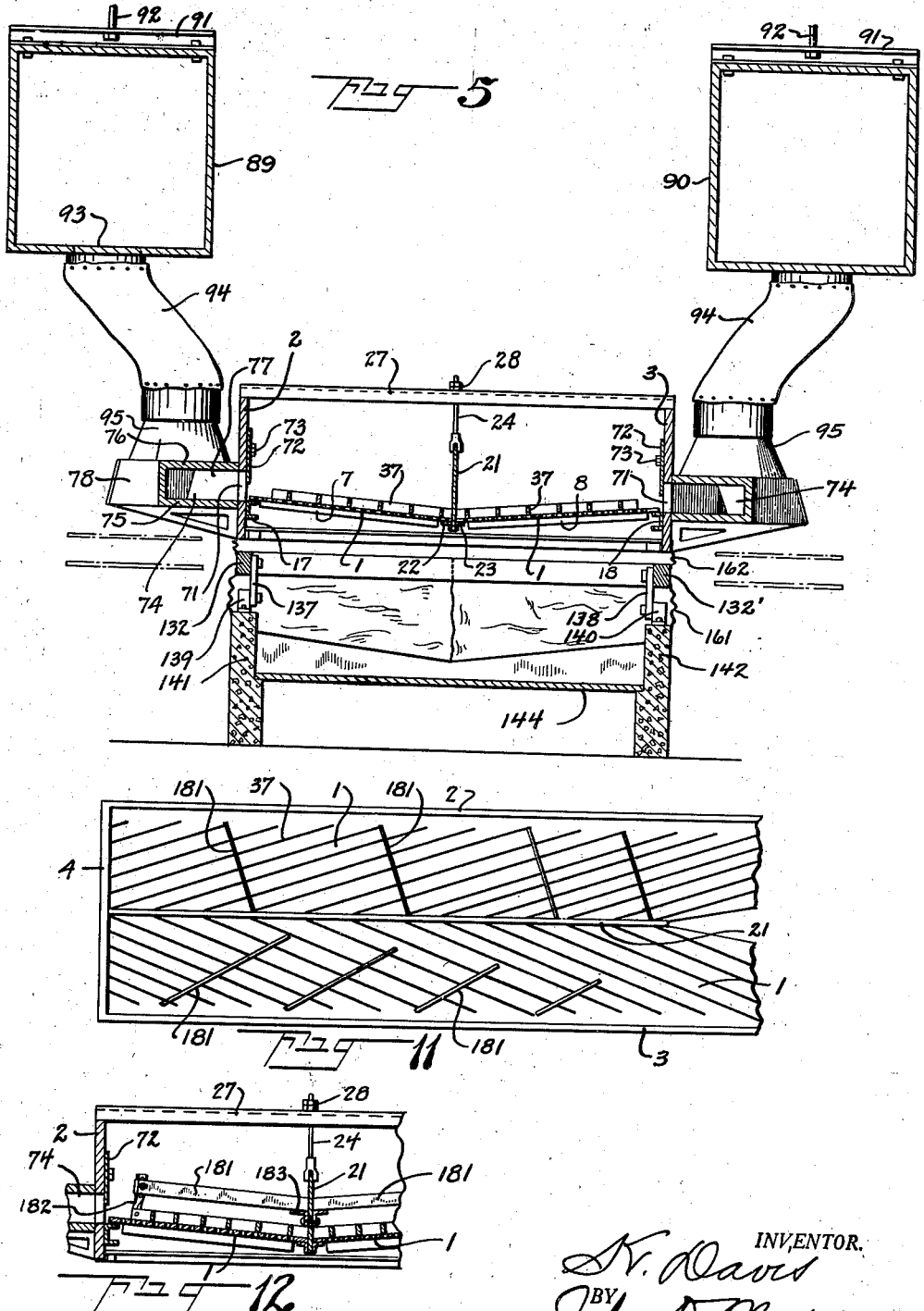

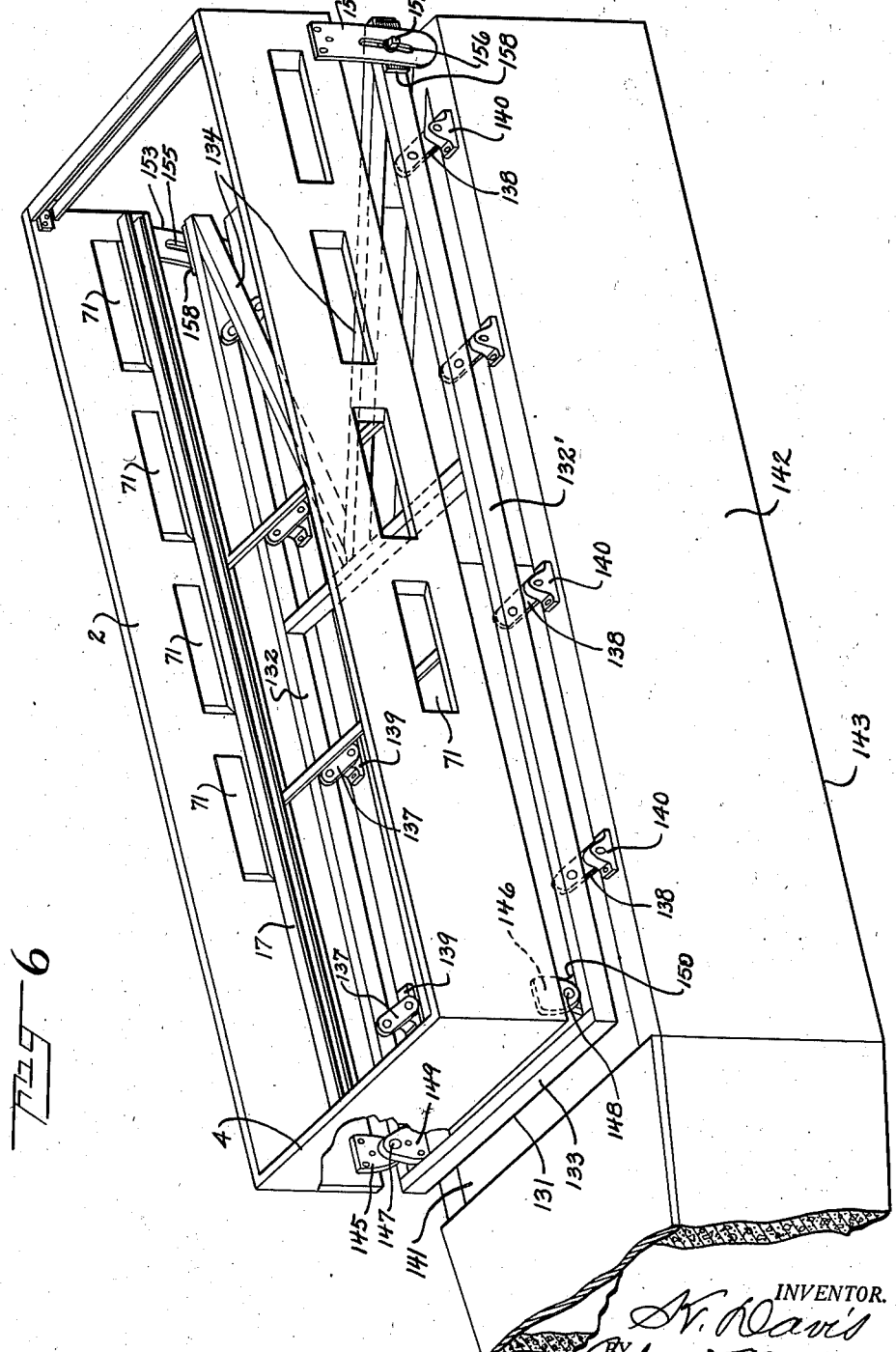

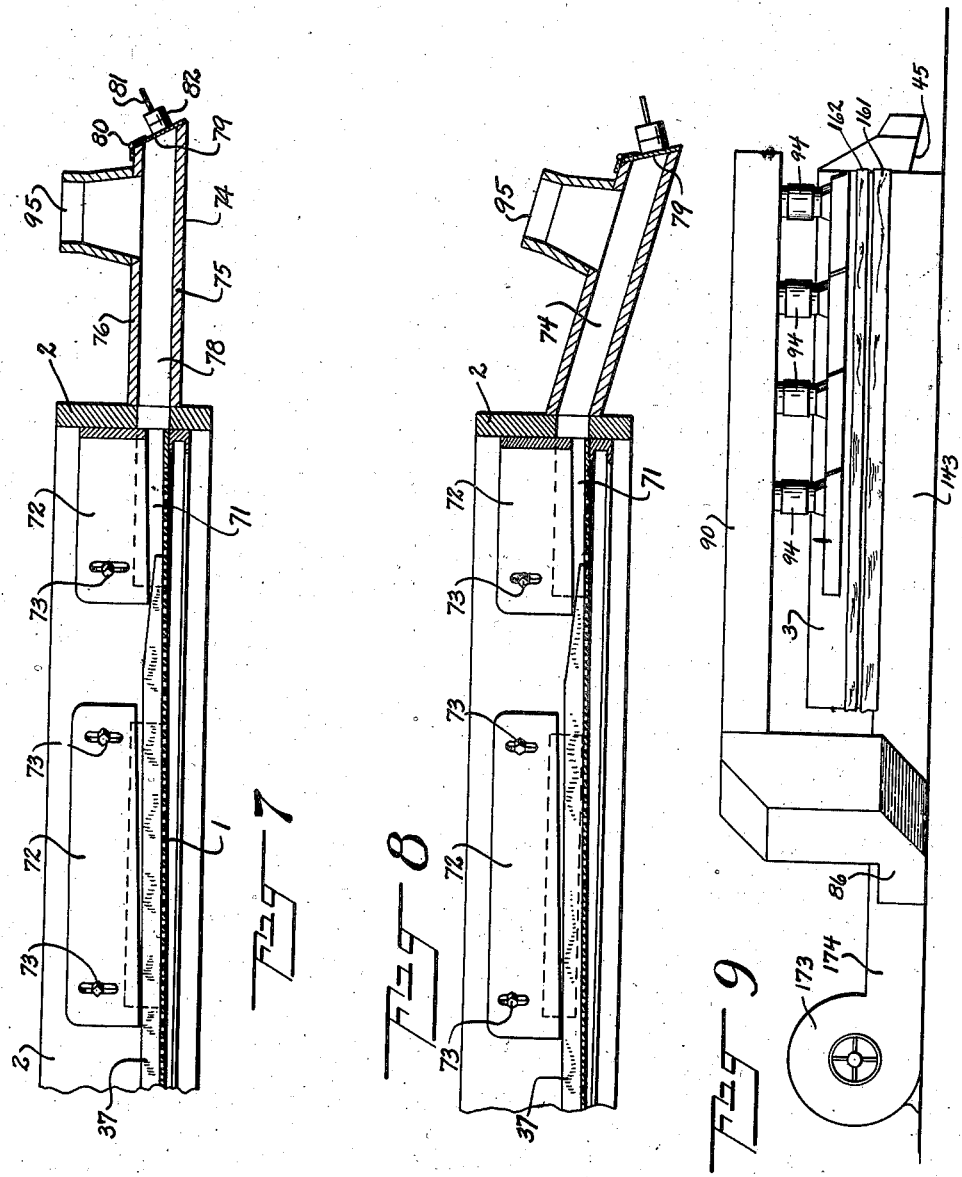

2,079,246

UNITED STATES PATENT OFFICE 2,079,246

PROCESS AND MECHANISM FOR SEPARATING INTERMIXED DIVIDED MATERIALS

Kenneth Davis, Ebensburg, Pa., assignor, by mesne assignments, to Peale-Davis Company, Wilmington, Del., a corporation of Delaware Application May 12, 1927, Serial No. 190,925
Renewed January 25, 1935

11 Claims. (Cl. 209—467)

The invention relates to a novel and useful process and mechanism for separating intermixed, divided materials, and it relates more particularly to such a process and mechanism especially adapted and capacitated for separating intermixed, divided materials wherein the pieces or particles vary relatively very greatly in size but vary relatively little in their specific gravities.

Objects and advantages of the invention will be set forth in part hereinafter, and in part will be obvious herefrom, or may be learned by practising the invention; such objects and advantages being realized and attained by the steps, and through the instrumentalities pointed out in the appended claims.

The invention consists in the steps, processes, parts, combinations, constructions and arrangements herein shown and described.

The accompanying drawings, herein referred to and constituting a part hereof, illustrate one embodiment of the invention and the preferred manner of practising the same, said drawings together with the description serving to illustrate the principles of the invention.

Of the drawings:

Fig. 1 is a top plan, with parts in section and parts broken away, of a mechanism embodying the invention;

Fig. 2 is a partial vertical, longitudinal section, on an enlarged scale, of the rear or left-hand portion of the mechanism of Fig. 1, and is taken on the line 2—2 of Fig. 1;

Fig. 3 is a vertical, longitudinal section, similar to Fig. 2, of the forward or right-hand part of the mechanism of Fig. 1, and is taken on the line 3—3 of Fig. 1;

Fig. 4 is a fragmentary, enlarged plan of a part of the forward or right-hand end of the mechanism of Fig. 1;

Fig. 5 is a transverse, vertical section taken substantially on the line 5—5 of Fig. 4;

Fig. 6 is an isometric, perspective view of the stationary air chamber and the vibrating table supporting mechanism of the preceding figures;

Fig. 7 is a fragmentary, vertical section taken on the line 7—7 of Fig. 4;

Fig. 8 is a vertical section corresponding to Fig. 7, but showing a modified form of discharging mechanism for the heavier separated material;

Fig. 9 is a side elevation, on a reduced scale, of the mechanism of Fig. 1, and showing also parts omitted from Fig. 1;

Fig. 10 is a plan, largely diagrammatic of the present preferred air-zoning system, separating partitions, and showing the relation of the zoning system and separating partitions;

Fig. 11 is a top plan, partly diagrammatic, and showing the optional use of deflector plates for the superior stratum of material;

Fig. 12 is a fragmentary, transverse vertical section, similar to Fig. 5 and embodying the modification shown in Fig. 11.

The invention is directed to a method and mechanism for separating intermixed, divided materials, the term "divided" being used to designate broken, fragmentary, granular, pulverulent or other materials comprising separated parts or pieces of different kinds of materials.

The invention is more particularly directed, however, to effecting automatic separation of such mixtures of materials wherein the various pieces of the different kinds of materials vary very greatly in size, while varying relatively very little in their specific gravities.

This presents a problem of great practical difficulty, due to the wide range of variations in the sizes of the pieces of materials and the relatively small variance of their specific gravities. Separating work of this kind requires practically an entirely different process and mechanism or apparatus from the separation of materials which are very finely pulverized, which vary very widely in their specific gravities, or which are very carefully and extensively sized prior to the separating process.

The terms "lighter" and "heavier" as used hereinafter will be understood as applying to the specific gravities of the various intermixed, divided materials, and not to the difference in mass of particular pieces of various sizes.

One kind of intermixed, divided materials, which the invention is especially capacitated to successfully separate is a mixture of coal, "bony" and rock, and other impurities, as it comes from the mine, the rock and other impurities being separated from the coal by my invention entirely automatically, and without previous sizing of the materials except as to crushing or removal of the very largest lumps.

The invention further provides in addition to the capacities enumerated, a very wide and diversified positioning and other variation of the mechanism to most efficiently separate different kinds and conditions of materials, almost immediate and very nearly complete discharge of rock settling on any part of the table, and free and unconstrained, straight-ahead forward flow of the superior stratum. It provides also a compact structure and a relatively small table, requiring a relatively small expenditure of power for the driving of the table, and secures diversified and very efficient use of the material-buoying air current passing through the bed, while maintaining a very high output of successfully cleaned or separated material.

According to previous commercial practice, except by the cleaning tables disclosed in and covered by certain related co-pending application, it has been necessary to very closely size the coal by preliminary screening before attempting the automatic separation of the intermixed coal, bony and rock.

As an example of necessary previous commercial screening preparatory to separating:— All sizes above two inches were screened out; from two inches to 1 and ½ inches were screened as to the next size; then from 1½ inches to 1 inch; from 1 inch to ½ inch; from ½ inch to ¼ inch; from ¼ inch to ⅛ inch; from ⅛ inch to 1/16 inch; and from 1/16 inch down were screened out on successive screens. Each of these sizes is then sent to a different separating table. Thus seven or eight different screens are required and seven or eight separating tables, one for each different size of the intermixed materials produced by screening, making about fourteen or more machines and operations in all.

By my invention, I dispense with all of the screening mechanisms of said prior art and with all but one of the separating tables. I use only a single large separating table, and over this single table I send the unprepared, intermixed materials, which prior to my invention were necessarily sent first over the several screening mechanisms, and then over the corresponding separating tables, as described in the preceding paragraphs. I am able on this one table to practically completely separate the coal, rock, and bony and other impurities from pieces three inches in dimensions down to the finest dust.

My present invention pertains broadly to that type of materials-separating mechanism wherein a bed of the intermixed materials is continuously maintained upon, and is slowly progressed along, a longitudinally vibrating, air-pervious table, the bed of materials being subjected to the buoyant or flotant action of the air currents passing upwardly through the table. The particles of the intermixed materials are thereby separated, the particles of the heavier material settling upon the table, and the particles of the lighter material being floated upwardly to and moved forwardly to constitute a separated superior flotant stratum and stream. The heavier materials, which settle upon the table, are propelled forwardly along the surface of the table by friction and inertia, and are constrained by means of separating partitions or similar devices to move along a short and quick path to a place of discharge.

My present invention furthermore in some of its aspects is in the nature of an improvement on the devices of certain of my prior applications, co-pending herewith, wherein the separated and settled heavier material is impelled quickly and directly transversely out of the bed of materials to a pathway along the side edge thereof, and is ejected as soon as may be not only from the bed but from the mechanism, whereas the superior stratum or separated lighter material is given a free and unrestricted path directly forwardly along the table to discharge at the forward end thereof.

My invention in its present preferred form, broadly considered, comprises an air-pervious table, which is relatively long and narrow, and which may be of substantially rectangular form, although this form may be widely varied. The table is longitudinally reciprocable, and is angularly variably positionable or inclinable both longitudinally and transversely thereof, as may be found most efficient in the separation of materials of different kinds or in different physical conditions.

This preferred embodiment of the air-pervious table is inclined upwardly and outwardly transversely or cross-wise from the substantially central longitudinal axis thereof, the inclination of the two halves of the table being variable, together or separately, as already indicated and later described in detail.

On the surface of the table are separating partitions, spaced-apart and preferably parallelly-arranged, the rearmost having their rear and inner edges abutting on the back end of the table, and the more forwardly having said ends at or near the central lower part of the two table halves. The separating partitions are outwardly and forwardly inclined, terminating somewhat short of the side retaining walls of the table, thus providing unobstructed channels along the side edges of the table. They participate in the separating operation, and also guide the settled rock or other heavier materials and impurities directly from all parts of the bed to the side edges thereof, and permit the forward flow of the settled rock or other heavy material along the side edges of the table and substantially outside of the bed of material, in the sense that there is practically no tendency to remix the separated rock with the coal or other lighter material. In connection therewith means are provided for effecting the immediate discharge of the separated rock in regulable quantities at various places throughout the greater part of the length of the side edges of the table.

Means are likewise provided for regulating the relative amount of the intermixed materials fed on to the various parts across the rear end of the table with respect to the inclination of the table transversely. Means are likewise preferably provided for controlling the flow of the lighter material longitudinally of the table, tending to direct it somewhat toward the central part of the table, while in a general sense not impeding the unrestricted forward flow of said superior stratified coal or other lighter material.

In connection with the foregoing, various devices are employed for regulating and directing the action of the air currents through and upon the materials during the process of stratification and separation, and also to insure a clean and sharp division in the discharge of the separated materials. For this purpose the intensity of the air action in different parts of the table is regulated in connection with the gradual progress of the separation of the materials constituting the bed as it moves forwardly along the table, and the air action is also utilized to prevent the escape of the lighter materials at the various places of discharge of the heavier material.

Means are provided by the invention also for separating and discharging an intermediate product, that is, one of intermediate specific gravity, such as the "bony" frequently intermixed with the coal and rock and other impurities.

The foregoing general description, and the appended detailed description as well, are explanatory and exemplary of the invention, but are not restrictive thereof.

Referring now in detail to the embodiment of the invention illustrated by way of example in the accompanying drawings, an air-pervious deck or table 1, which may consist of a perforate metal plate or series of plates is provided, supported on a suitable frame within side and rear end retaining walls 2, 3 and 4, for the bed of intermixed materials maintained upon the table.

The bed or deck 1 is separated substantially along its longitudinal center into two parts (Figs. 1 and 5), the adjacent central edges of the two parts being vertically movable to effect the regulation of the transverse or sidewise inclination of the bed. For this purpose, the two halves of the perforate deck 1 are provided with transversely-disposed, cross-supporting members 7 and 8, which preferably extend along the under side of the table, just beneath the separating partitions. At the outer edges thereof the two parts of the table rest upon corresponding channel frame members 17 and 18, fixed to the lower part of the side walls 2 and 3 of the table.

The inner and adjacent side edges of the two parts of the deck 1 abut upon a longitudinally-disposed, vertically-extending partition wall 21, extending from the rear retaining wall 4 of the table to the rear and central part of the discharge edge for the coal or other lighter material. For the purpose of supporting and positioning the two parts of the deck, there are fixed to the lower edge of the separating wall 21, at either side thereof, two angle beams 22 and 23. The inner side edges of the two parts of the deck 1 rest on the tops of these two angle beams, as best appears from Fig. 5. The partition wall 21 and therewith the inner edges of deck 1 are suspended from above. Accordingly pivotally connected at various points along the top edge of the separating wall 21 are a series of supporting rods 24, which are screw-threaded at their upper ends, which pass through apertures in supporting cross-bars 25, 26 and 27, which bars extend across the table, with their ends resting upon the tops of the side-walls 2 and 3 of the bed. Nuts 28 are screw-threaded on these rods, raise and lower the partition wall 21 and therewith the inner edges of the two parts of the bed 1, thereby varying the inclination transversely of the two halves of the bed as may be desired.

The separating partitions are preferably graduated in height longitudinally of the table, and the present preferred form thereof is shown in the upper part of Fig. 10. In this embodiment the separating partitions increase in height forwardly of the table. With certain kinds of materials and under certain conditions of operation, these conditions may be widely varied as found efficient or desirable. As embodied the varying heights of the partitions are shown diagrammatically in connection with the air zoning, or at least with the same indications. For example, the partitions in area *a* may be from ¾ inch to 1 inch in height; those in the successive areas gradually increasing to 2 inches in area *e*. These dimensions may be widely varied as desired. The outer ends of the separating partitions toward the side rock channels 38 and 39 are preferably beveled as shown in Fig. 7.

The bed is provided on the upper surface thereof with a series of spaced-apart and preferably parallelly-arranged separating partitions 37. The rearmost members of the series abut against the rear wall 4 of the table and extend forwardly and outwardly. The separating partitions terminate a short distance from the side bed-retaining walls 2 and 3, to leave free, forwardly-extending channels 38 and 39 at either side for the forward flow of the streams of rock or other heavy material. Except at the rear end of the table the separating partitions abut on the wall 21 with just sufficient clearance to permit the vertical positioning of the table.

The forward and discharge end of the table for the superior stratified material is made as long as practicable and to extend for the whole width of the table. Accordingly this front discharge edge 39 is of V shape, as best shown in Fig. 1, and is inclined inwardly and rearwardly from the front ends of both side bed-retaining walls 2 and 3, extending a long distance backwardly into the table, in the present instance considerably more than one-third of the length of the table, although it will be understood that this relation may be very widely varied, as found desirable and efficient under various circumstances and with different intermixed materials.

Means are provided for taking off and delivering the separated superior stratum of coal or other lighter material, and as embodied, a chute 45 is connected at its upper edge along the discharge edge 39 of the table. Chute 45 is inclined forwardly, downwardly and inwardly, and terminates in a forwardly-inclined spout 46, which discharges on to an endless conveyor belt 47, or other suitable conveying device.

In the present embodiment means are also shown for taking off an intermediate product, and as so shown this comprises side chutes, or separating walls or blades 48 and 49, beginning at or near the forward end of the table. The rear or inner ends thereof are angularly adjustable transversely to the table, to vary the area of intake of these chutes, to accommodate different percentages of separation of an intermediate product. These chutes or passages terminate in discharge chutes 50 and 51, which discharge the material on to an endless conveyor belt 52 or other suitable or convenient conveying device.

Means are likewise provided by the invention, as already briefly indicated, for taking off the rock and other impurities, or other separated and settled heavier material, at a plurality of points along the side edges of the table, the use of these devices, or any desired number thereof, being optional, and the amount of the discharge of the material being regulable for the various devices. In Fig. 1 there are four such discharge devices for the rock shown at either side of the table, and these devices are shown in detail in Figs. 5 and 7.

They comprise openings 71 formed in the corresponding side walls 2 and 3 and just above the surface of the table. The area of these openings is regulable by suitable means, such as sliding plates 72, arranged above the openings with both bolt and slot mountings 73 on the side walls, whereby the plates 72 are thus vertically positionable not only to vary the area of the discharge openings 71, but also to regulate the height or thickness of the escaping stream of rock or other heavier material. These openings discharge into passageways 74 having bottoms 75 and tops 76 and side walls 77 and 78.

At the exterior discharge end thereof these passages are preferably provided with pressure-regulating discharge means, shown as gates 79, hinged at 80 to the tops of the corresponding passages. The gates are provided with outwardly-extending pins 81, upon which may be placed, if desired, weights 82 to regulate the amount of pressure exerted against the outwardly-moving stream of rock or other heavier material. Thus the separated rock is impelled by friction and inertia and by the separating partitions to the side edges of the table, and is forced outwardly through the channels 78. By positioning the plates 72, and by regulating the pressure on the gates 79 the flow of the rock may be regulated so as to just fill the openings in the side walls of the table to permit the passage of all the separated rock at this point, but preventing the escape of coal or other lighter material.

Means are optionally provided for utilizing air pressure as a further check against any discharge of lighter material. In the embodied form thereof, devices are provided for forcing a regulable current of air backwardly through the rock discharge channels 74 into the bed. In the embodied form thereof, mains or headers 85 and 86 are taken off at either side of the main air conduit 88 and are carried forwardly and upwardly as best appears from Figs. 1, 5 and 9. The headers 89 and 90 extend along at either side and above the table, and are supported by short cross beams 91, fixed to the top thereof, and carried by corresponding supporting rods 92. At each of the side rock discharges there is an opening 93 in the bottom of the corresponding header, which connects by a flexible tube 94 with a flaring pipe 95 opening into the top of the corresponding rock channel 74. There is thereby provided a regulable air pressure or air current supply for each of the discharge channels, the pipe 94 giving a flexible connection to allow for the vibration of the table.

The intensity of the air currents forced upwardly through the air pervious deck 1 is varied or regulated longitudinally and transversely of the table, as may be found most efficient and desirable. With most intermixed materials it will be found that the most intense air action is needed at the rear end of the table, and in the present embodiment a large proportion of the rear end of the table is subjected to air currents of the greatest intensity. The present preferred arrangement is shown diagrammatically in Fig. 10, the area of the greatest air current intensity being indicated by $a$, and the areas of gradually less air current intensity being indicated seriatum by $b$, $c$, $d$ and $e$. In the present preferred form these areas of lesser air current intensity are disposed longitudinally and outwardly with respect to the table, and extend substantially in the general direction of the separating partitions, as will be clear from the upper half of Fig. 10, where their interrelation is exemplarily shown.

It will be understood, however, that the relative intensities of the air currents and the relative proportions and positions of the corresponding areas may be widely varied, but in most instances a decreasing air current intensity forwardly and inwardly of the forward portion of the table will be found efficient, with a large proportion of the rear end of the table subjected to a relatively great, if not the greatest, air current intensity.

Means are provided by the invention for feeding on the intermixed materials to the rear end of the table, and in connection therewith devices for regulating the feed so as to maintain the bed of the desired thickness upon the table. In the embodied form thereof, a hopper is provided having side walls 101 and 102, and inwardly and downwardly inclined front and rear walls 103 and 104, with an opening 105 at the bottom end thereof. Transversely across this opening is arranged a shaft 106, journaled in the side walls of the hopper.

Fixed tangentially on the shaft 106 are a plurality of feeding-blades 107, which rotate within a parti-cylindrical plate 110, fixed to the lower part of the hopper wall 4. The blades 107 at their ends are fixed to cylindrical plates 108 and 109 fixed on the shaft 106. The shaft 106 and its feeding blades 107 are rotated by a variable speed drive to regulate the rate of feed of the intermixed materials from the hopper, and such regulable speed driving means may be of any known or suitable form. A chute 112 is provided for directing the materials from the hopper on to the rear end of the bed, and as shown has a bottom 113 and side walls 114 and 115.

Variably positionable, material directing plates may be utilized in this chute, such as are shown and described in the copending application of Richard Peale, Ser. No. 183,262, filed April 13, 1927. As shown, a deflecting plate 117 is mounted in operative relation to one-half of the rear end of the table, and a similar device could be used likewise for the other half. In this case, a central fixed partition would probably also be used in line with the division between the two halves of the table.

The upper end of this plate has a bolt connection 118, positionable in a plurality of holes in the bottom 113 of the chute, and the lower end thereof has a bolt connection 120 positionable in a plurality of holes 121 in the bottom 113 of the chute. Thus both the bottom and top ends of the deflecting plate 117 are independently laterally positionable and any desired proportion of the intermixed materials may be fed on to any desired area of the corresponding width of the rear end of the table. Usually, a larger proportion of the material will be fed to the lower central part of the table, and this may be varied as will be found most desirable and efficient.

The preferred form of means for mounting and longitudinally vibrating or reciprocating the table is structurally combined in the present embodiment with means for varying the longitudinal inclination of the table. In this embodiment the table is forwardly and upwardly inclined, with means for varying the angle thereof, and the table is likewise uniformly longitudinally reciprocated. It will be understood, however, that the speed and timing of the backward and forward movements of the table may be varied by the use of any suitable devices, such as those shown in certain of my previous and copending applications or in that of Richard Peale, Ser. No. 183,262 already referred to.

In said embodied form of table mounting (Figs. 2, 5 and 6) a frame 131, having side reaches 131 and 132, a rear end reach 133 and a V-shaped forward end 134, is pivotally mounted at either side on the upper end of corresponding series 137 and 138 of upwardly and forwardly inclined supporting links, the lower ends of these series of links being pivotally mounted on corresponding series of brackets 139 and 140, mounted on the upper surface or edge of the side walls 141 and 142 of the stationary air chamber 143. The air chamber has also a bottom 144. Thus the table structure is longitudinally reciprocable with respect to the stationary air chamber.

In the embodied form of means for variably inclining the table or deck, the latter is pivotally mounted on the reciprocable frame just described. The side walls 2 and 3 of the table are provided at the rear end with downwardly-projecting hinge plates or brackets 145 and 146, respectively, which have pivotal bearings 147 and 148 in corresponding hinge plates 149 and 150, fixed to and extending upwardly from, the rear ends of the corresponding side frames 131 and 132. At their forward ends, the side walls 2 and 3 of the table are provided with downwardly-projecting plates 153 and 154, having formed therein arcuate slots 155 and 156. Screw bolts 157 pass through these slots and are screw-threaded into corresponding plates 158 fixed on the forward end of the side frame members 131 and 132.

Thus by means of the bolt and slot connections 157 and 158, the longitudinal inclination of the table may be suitably variably regulated, and by means of the screw rods 24, as already described, the transverse inclination of the two halves of the table may be harmoniously regulated. To make an air-tight connection between the various relatively-movable parts, a flexible member of canvas or other material 161 connects the upper part of the air chamber 143 with the frame 130, and a like flexible member 162 connects the frame with the side and end walls of the table.

The embodied form of means for the reciprocable table, as stated, gives a uniform motion, and as embodied, a yoked lug 165 is fixed to the rear end of the table and one end of a connecting rod 166 is pivotally connected thereto at 177. To the other end of this rod is connected an eccentric strap 167 of an eccentric 168 fixed on a shaft 169. Shaft 169 is journaled in bearings 170 and 171, and is driven by any suitable means such as belt pulley 172.

The illustrated source of air current or air pressure is a fan 173, blowing into a conduit 174 connecting with the air chamber 143. The source of air current supply may be of any desired form, and the amount or intensity thereof may be varied by means of suitable shutters, deflectors, or by any known or suitable means. It may also have a variable speed drive of any suitable or known form.

Means are provided for optional use for directing the superior separating stratum of coal or other lighter material, in greater or less degree, toward the central part of the bed, as it moves forwardly along the table. As embodied, a plurality of deflector strips 181 are mounted upon supports 182 and 183 (Figs. 11 and 12) to be variably vertically positionable, and they are inclined inwardly and forwardly toward the central part of the table. These may extend entirely to the central partition 21, as shown in Fig. 11, but in many instances their inner ends will be spaced away from the partition 21 a greater or less degree so as to provide a free central unobstructed channel for the forwardly moving superior stratum of lighter material.

The manner of operation of the hereinbefore described mechanism is substantially, as follows: It may be initially assumed that a bed of the materials undergoing gradual separation is maintained upon, and is progressing forwardly along, the table, the feed of intermixed materials from the hopper being regulated to effect and to maintain this condition. The deflector plates may be set so as to throw the materials in greater or less proportion to various areas transversely of the feed end of the table, usually feeding a greater proportion toward the central and lower part of the table at the rear end thereof. The transverse inclination of the two parts of the table, and the forward inclination thereof will have been determined for the greatest efficiency with the particular work being done.

As the material advances along the table, the upwardly moving air currents will separate the particles of intermixed materials from close contact with each other, permitting the settling of the larger particles of heavier material and buoying and floating upwardly the particles of the lighter material. Certain of the heavier particles will immediately settle upon the table, and due to the reciprocating action will be impelled forwardly by friction and inertia, but the separating partitions will impel these very quickly and by a short path to the side edges of the table and practically out of the bed of materials.

As the materials travel forwardly along the bed, and especially when the areas of lesser air current intensity are progressively reached, the smaller and smaller particles of heavier material will either settle upon the table, or will sink below the level of the tops of the separating partitions, and consequently will be impelled by the short and direct route out of the bed of materials and to the side edge of the table, this operation progressing forwardly along the table until even the minutest particles of the heavier material have settled upon the table or fallen within the mechanical control of the separating partitions. In the meantime, the superior stratum of separated and clean coal or other lighter material is buoyed and carried along by the air currents and the movement of the bed, and flows directly forwardly along the bed along the path of least resistance and greatest mechanical efficiency to discharge at the front end of the table.

By reason of the inclined discharge edge, the discharge area for the coal or other superior stratum is relatively very extensive, and it also extends for a long distance longitudinally into the table and provides for easy discharge of the coal without any crowding or transverse pushing thereof, which promotes efficiency, large output, and prevents remixing of the materials.

The various discharge openings at the sides of the table provide widely regulable, but immediate discharge for the separated and settled heavier material, permitting all of the settled heavier material, or as large a part thereof as may be best, to be discharged at the various points along the side edges of the table, while preventing any discharge of the coal or other superior lighter material at such points. The backwardly directed air currents at these points may also be utilized when desired to further insure this result.

The rock, or other heavier material in the channels 38 and 39, at the side edges of the table, and also the rock flowing thereinto from between the separating partitions, will tend to crowd into the opening 71. The flapper gates 79 may be regulated to swing open at a variable predetermined pressure of the stream of rock flowing out through the conduit 74, and thereby the rate of flow through this means of discharge is most nicely regulated. The thickness or depth of this stream of rock or other heavier material flowing outwardly through any given opening 71, is also nicely regulated by the setting of its slide 72. These two devices may be set to operate together to discharge all or most of the rock which has been separated and delivered to that particular point at the side edge of the table, while preventing the discharge of any of the coal or other lighter material. The air blast blown backwardly through the conduit 74 will also tend to prevent any coal particles intermixing and flowing outwardly with the discharging rock.

If the deflecting partitions 181 are employed, these will be set sufficiently high to be entirely at the level of the completely stratified coal or other lighter material, and the number, sides and position of these deflecting strips may be such as to direct a desired part of this stratum of coal toward the central part of the table.

Thus the separating action will progress forwardly along the table, the smaller and slower particles of rock and other impurities settling below the level of the separating partitions, and thus traveling toward the side edges of the table and substantially out of the bed, and eventually even the finest rock dust, and other impurities will settle upon the table and be discharged in the manner described. The superior stratum of the separated coal will become greater and greater in volume and will finally be discharged at the forward end of the table as already described.

From the foregoing, it will be understood that a process and a mechanism for practicing the same has been provided realizing the objects and advantages set forth, together with other objects and advantages; and that departures may be made from the precise manner of carrying out the process, and from the details of structure of the mechanism, without departing from the principles of the invention and without sacrificing its chief advantages.

What I claim is:—

1. A mechanism for separating intermixed divided materials varying relatively greatly in size and varying relatively little in specific gravities including in combination an air-pervious table longitudinally and transversely inclined, separating partitions forwardly and upwardly inclined on the table, a plurality of discharge devices disposed along a side edge of the table adjacent the forward ends of the separating partitions and means operating mechanically and by air action at the side edge discharge devices for regulating the discharge of the heavier material.

2. A mechanism for separating intermixed divided materials varying relatively greatly in size and varying relatively little in specific gravities including in combination an air-pervious table, transversely inclined, separating partitions forwardly and upwardly inclined on the table but terminating short of the side edge of the table to provide a longitudinal channel for the heavier material, a plurality of discharge devices disposed along a side edge of the table adjacent the forward ends of the separating partitions and pressure controlled means for regulating the discharge of heavier material from said side-edge discharge devices.

3. The process of separating intermixed divided materials varying relatively greatly in size, but varying relatively little in their specific gravities which comprises maintaining a bed of the intermixed materials upon and progressing it along an air-pervious table and separating and stratifying the intermixed materials of the bed by forcing air through the bed of materials, progressing the superior stratum of lighter materials forwardly along the bed in a central stream to discharge at the forward end of the table, impelling a settled heavier material laterally out at the side edges of the bed by friction and inertia, immediately discharging the separated heavier material as it separates by continued lateral impulsion in the directions of separation and controlling the discharge by air and mechanical pressure to prevent remixing of the separated materials.

4. In a process for separating intermixed divided materials varying relatively greatly in size and relatively little in specific gravity, the steps of impelling a flotant stratum of lighter material forwardly along an air-pervious table to discharge at the front thereof, impelling the settled heavier material laterally to discharge at a plurality of points along the side of the table, and controlling the discharge of the heavier material by progressing the heavier material to discharge against the action of air and mechanical pressure.

5. In a process for separating intermixed divided materials varying relatively greatly in size and relatively little in specific gravity, the steps of impelling a flotant stratum of lighter material forwardly along an air-pervious table to discharge at the front thereof, impelling the settled heavier material laterally to discharge at a plurality of points along the side of the table, and controlling the discharge of the heavier material by progressing the heavier material to discharge against the action of gravity, air and mechanical pressure.

6. A mechanism for separating intermixed divided materials including in combination a relatively long and narrow air-pervious table having a plurality of separating partitions disposed forwardly and outwardly of the table and material retaining walls along the sides, means for maintaining a bed of the materials upon the table undergoing gradual stratification and separation, and means for reciprocating the table longitudinally whereby the lighter flotant material is impelled freely forwardly and the settled heavier material impelled laterally to discharge immediately at openings along the side wall, said table being inclined upwardly both forwardly and laterally whereby both the heavier and lighter materials progress against gravity to discharge and means for independently varying the longitudinal and lateral inclinations.

7. A mechanism for separating intermixed, divided materials including in combination a longitudinally reciprocable, air-pervious table having separating partitions thereon for directing settled heavier material transversely of the table to discharge along the side edge thereof, a plurality of discharge devices disposed along the side edge, a source of air under pressure for supplying air to the table and a plurality of air conduits communicating with said source for supplying air to said discharge devices.

8. A mechanism for separating intermixed, divided materials including in combination a vibratable air-pervious table having a plurality of discharge devices for heavier material, an air chamber for supplying air to the table, a conduit for diverting a portion of the air from the chamber and means for conducting air from the conduit to each of said discharge devices.

9. A mechanism for separating intermixed, divided materials including in combination a vibratable air-pervious table having a plurality of discharge devices for heavier material, a stationary air chamber for supplying air to the table, a conduit for diverting a portion of the air from the chamber and flexible means for conducting air from the conduit to each of said discharge devices.

10. A mechanism for separating intermixed, divided materials including in combination a vibratable air-pervious table, an air chamber beneath the table for supplying air under pressure thereto, a plurality of discharge devices along a side of the table, an air conduit above the table, and means for supplying air under pressure from said conduit to said discharge devices.

11. A mechanism for separating intermixed, divided materials including in combination a vibratable, air-pervious table, an air chamber beneath the table for supplying air under pressure thereto, a plurality of discharge devices along a side of the table, and means above the table for supplying air under pressure to said discharge devices.

KENNETH DAVIS.